A. Newton,
Cage Trap.
No. 106,858.  Patented Aug. 30, 1870.

WITNESSES.
T. Scheitlin
Wm. A. Brereton Jr.

A. Newton
By Knight Bros
Attorneys

United States Patent Office.

ABNER NEWTON, OF DARBY CREEK, OHIO.

Letters Patent No. 106,858, dated August 30, 1870.

IMPROVED ANIMAL TRAP.

The Schedule referred to in these Letters Patent and making part of the same.

I, ABNER NEWTON, of Darby Creek, in the county of Madison and State of Ohio, have invented an Improved Animal Trap, of which the following is a specification.

Nature and Objects of the Invention.

The invention consists of a cage suspended over a platform, and retained by a trigger, which is released by tampering with the bait, allowing the cage to drop. The bait is in a cup suspended from a lever, which actuates the trigger. The animal resting a paw or its head on the edge of the cup, depresses the latter and trips the releasing device.

Description of the Accompanying Drawing.

General Description.

Figure 1:
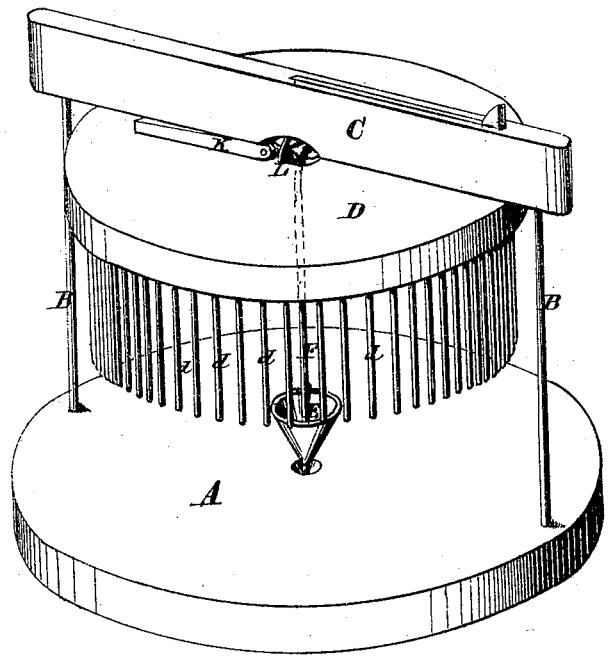
Figure 1 is a perspective view of the trap with the cage raised.
Figure 2:
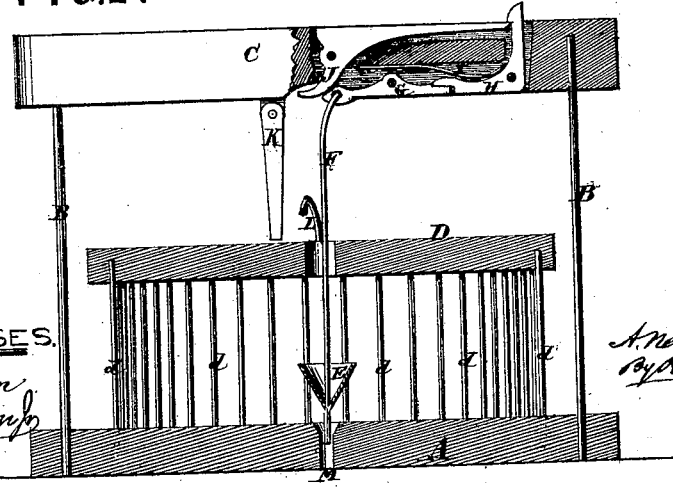
Figure 2 is a vertical section with the cage dropped.

A is the platform, from which rise two posts, B B, supporting a bridge piece, C, the cage consisting of a board, D, and a circular series of vertical wires, d d d, &c., whose lower ends are in contact with the platform, when the cage is dropped, as shown in fig. 2.

The cage is suspended by a loop, L, from the hook J, which is held by a notch on one arm of the rock-shaft H.

G is the trigger, by which the rock-shaft is moved.

From the trigger G depends a wire, F, at whose lower end is a bait-cup, E.

Beneath the cup E the wire is continued downward, and slips into the opening M, when the cup is depressed.

K is a swinging bar, which is folded up against the beam C when the trap is set. The bar becomes suspended from its pintle when the cage falls, and thus prevents the cage being tipped by the captured animal.

The trap is intended for rats, mice, or other vermin, or for fur-bearing animals, the size being proportioned to the duty.

Operation.

The trap is set by suspending the loop L of the cage from the lever J, the notch of the rock-shaft H catching over the end of the lever to retain it. The spring I keeps the said catch in position. When the paw or nose of the animal presses the edge of the cup, in reaching after the bait, the wire F is drawn down, tipping the lever G and rock-shaft H, so as to release the lever, whose oscillation allows the cage to fall by its own weight. The bar K then swings down and prevents lifting or tipping of the cage.

Claim.

What I claim as new is—

The combination, with a suspended cage, of the loop L, lever J, and tripping devices H G, operated by a suspended bait-holder, substantially as described and represented.

ABNER NEWTON.

Witnesses:
M. A. WINGET,
J. F. CHAPMAN.